Figure 1:
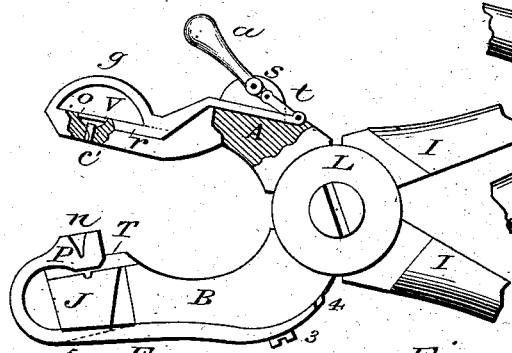

(No Model.) 2 Sheets—Sheet 1.

J. H. GOODFELLOW.
IMPLEMENT FOR ATTACHING BUTTONS.

No. 290,181. Patented Dec. 11, 1883.

Witnesses:
Austin F. Park
James T. Goodfellow

Inventor:
John H. Goodfellow (No Model.) 2 Sheets—Sheet 2.

J. H. GOODFELLOW.
IMPLEMENT FOR ATTACHING BUTTONS.

No. 290,181. Patented Dec. 11, 1883.

Witnesses:
Austin F. Park
James T. Goodfellow

Inventor:
John H. Goodfellow

UNITED STATES PATENT OFFICE.

JOHN H. GOODFELLOW, OF TROY, NEW YORK.

IMPLEMENT FOR ATTACHING BUTTONS.

SPECIFICATION forming part of Letters Patent No. 290,181, dated December 11, 1883.

Application filed June 14, 1883. (No model.)

*To all whom it may concern:*

Be it known that I, JOHN H. GOODFELLOW, of the city of Troy, in the county of Rensselaer and State of New York, have invented certain new and useful Improvements in Implements for Attaching Buttons to Shoes, of which the following is a specification, reference being had to the accompanying drawings.

My invention relates to improvements in implements for attaching buttons to shoes and similar articles by means of U-shaped staples that extend through the eye of the button and placed in the upper jaw of an implement adapted to receive a U-shaped staple, and the mechanism of the lower jaw spreads apart the legs thereof and turns outwardly and upwardly against the fabric in a line with each other and its loop.

My invention consists of a spring securely attached to the lower jaw at one end, and provided with a spring-controlled anvil, in which are deflecting-dies, the latter arranged to be presented to the face of the upper jaw, and the lower jaw provided with a front vertical slot in its extreme end sufficient to admit of the downward movement of said anvil, and also a curved upper face provided with suitable guide-dies acting in conjunction with the anvil, the latter to spread the staple-legs apart, and the former to guide them outwardly and upwardly against the fabric at an acute angle from its loop and in a line with each other as they are pressed in position by the upper jaw.

It also consists of an implement having two jaws and a joint-pivot, one of which is provided with means for holding a button and staple, and the other a yielding spring-controlled anvil having deflecting-dies in its upper face, controlled by a supporting-spring, and a curved upper face provided with guide-dies therein, by which the staple-legs are forced and guided outwardly and upwardly as they spread across the face of the lower jaw.

It also consists of an implement having two jaws and a joint-pivot, one of which is provided with means for bending and clinching a staple, and the other a sliding clamp mounted thereupon, and provided with means for gripping the loop of a staple on its inner sides, in conjunction with an arched groove and front vertical slot in the front end of the upper jaw, said clamp being manipulated by suitable leverage to firmly clamp and hold the staple in a vertical position between said clamp and end of the jaw thereof.

Figure 2:
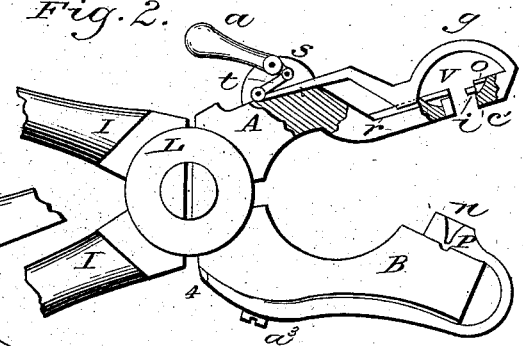
Figure 3:
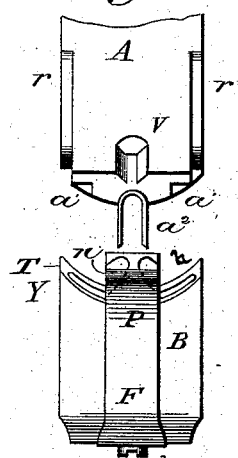
Figure 4:
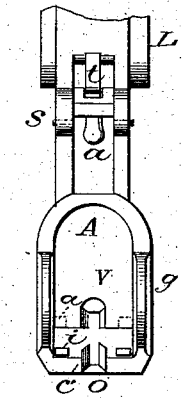
Figure 5:
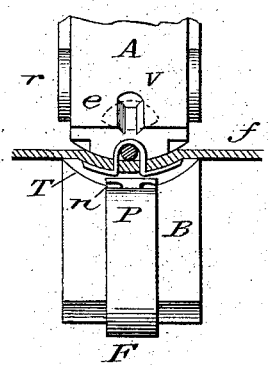
Figure 6:
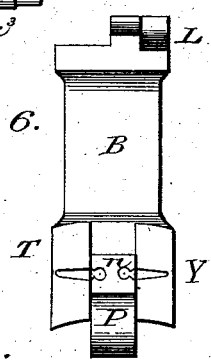
Figure 7:
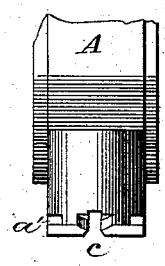
Figure 9:
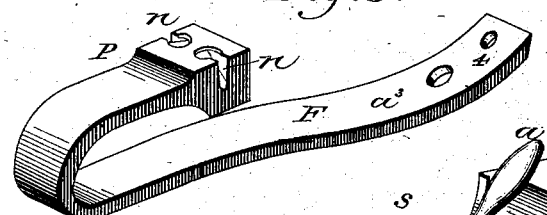
Figure 8:
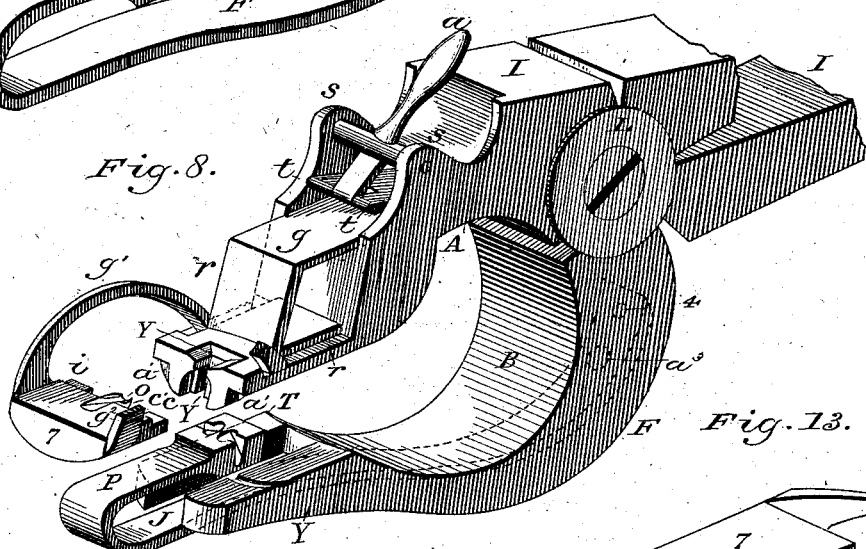
Figure 13:
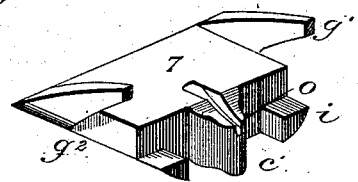
Figure 14:
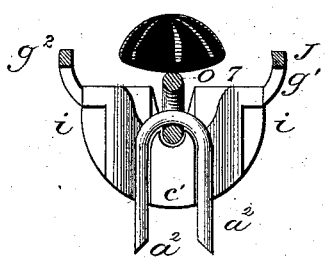
Figure 11:
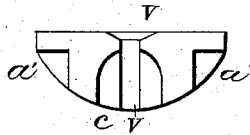
Figure 10:
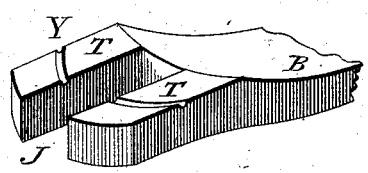
Figure 12:
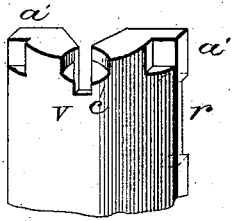

In the drawings, Figure 1 is a side elevation, partly in section, showing my improved implement with part of the lower jaw removed, with spring on the lower jaw and clamping device closed against the end of the upper jaw. Fig. 2 is a side elevation, partly in section, showing my clamping device opened ready to receive the button and staple hereinafter described; Fig. 3, a front elevation of the upper and lower jaw with the clamping device and button omitted, leaving the staple in position over the spring-controlled anvil preparatory to being brought in contact therewith. Fig. 4 is a front elevation of the upper and lower jaws, showing the position of the anvil and spring after the staple has been driven through the fabric and the legs turned outwardly and upwardly upon the curved face of the lower jaw. Fig. 5 is a top plan view of the upper jaw and clamping device thereon spread apart, as seen in Figs. 2 and 8; Fig. 6, a plan view of the concave face of the lower jaw, anvil, and spring. Fig. 7 is a plan view of the forward portion of the convex face of the upper jaw. Fig. 8, Sheet 2, is an isometrical view of my improved implement on a large scale, with part of the sliding jaw and levers broken away; Fig. 9, a perspective view of the anvil and spring removed from the lower jaw; Fig. 10, a view of the forward end of the lower jaw; Fig. 11, a front elevation of the extreme end of the upper jaw; Fig. 12, a perspective view of the under side of the end of the upper jaw: Fig. 13, a view of the sliding jaw broken at its arms; and Fig. 14, a front elevation of the same, showing a staple and button in position over the grip-stud, hereinafter described.

The several parts of the implement containing my invention are designated by letters of reference, as follows:

A is the upper jaw, having a front vertical slot, *v*, and arched groove *c*, and two guide-pockets, *a' a'*, in its front end. (See Figs. 2, 3, and 8, 11, 12, Sheet 2.) The jaw is also provided with guideways *r r* in the top face. (See Figs. 2, 3, and 8.) Near the joint-pivot are made two supports, s s, (see Figs. 1, 3, and 8,) between which the lever a is pivoted, and by the link t the lever and one end of the clamping device g are connected. The latter is provided with two arches, g' g², which rigidly connect at the front end by the cross-bar 7, forming that part of the clamping device extending in advance of the jaw A. (See Figs. 1, 2, and 5, Sheet 1, and 8. 13, and 14, Sheet 2.) The object of these arches is to provide ample room for the passage of the button at either side of the jaw between the latter and said cross-bar. The latter is made to conform in outline to the front vertical section of that of the end of the jaw, and has provided on its inner side two guide-bolts, i i, a grip-stud, c', in the top of the latter, a shallow groove, o, which partly divides it, and is only employed when it is desired to use a button in connection with the staple. The grip-stud c' performs a distinctive function in the holding mechanism of the device, the working of which is as follows: The staple having been placed in the eye of the button, and the latter passed beneath the arch g' or g², with the button flatwise in the slot v and the staple-loop in the arched groove c, as shown, the lever a, now standing in the position shown in Figs. 2 and 5, Sheet 1, and 8, Sheet 2, is then pressed forward, as seen in Fig. 1, thereby bringing the cross-bar 7 and end of the jaw in contact. The grip-stud c' enters the staple-loop a² on both sides of the button-eye, (see Fig. 14,) and forces the staple-loop firmly up into the arch-groove c. The bolt-studs i i engage into the sockets a' a', thereby preventing any movement of the cross-bar when so locked. While the staple is thus held, it can be driven through the fabric, bent, and clinched without any apparent change of position in the jaw.

Another part of my invention is illustrated in the several figures, showing the lower jaw, B, to the lower side of which is securely attached the spring F by a screw, a³. Near the joint-pivot 4 is a steady-pin, which enters the jaw through the end of the spring to prevent displacement of the latter. This spring is shown so bent as to pass forward from its fastening beyond the extreme end of said jaw, thence up and over toward itself, so as to present the anvil P, which is preferably made on the free end thereof, as seen in Figs. 1 and 2. Said anvil is provided with two wedge-like deflectors, n n, in its top face, which are larger at their top than at their extreme bottom, as seen in Figs. 1, 2, 6, Sheet 1, and 8 and 9, Sheet 2. This spring also has a double-yielding power. Thus while the main portion in the act of bending has a tendency to convey the anvil near the end of the jaw, and that portion to which the anvil is a part has a tendency to convey the anvil the reverse, thereby retaining the dies in their proper position below the upper jaw. J is a front vertical slot in the end of the lower jaw, (see Figs. 8, 10, Sheet 2,) dividing the same into the sides T T, which are concaved in their upper face, (see Figs. 3 and 4;) and Y Y are two guide-dies arranged in a line with the deflectors n n of the anvil, which latter fit closely into the slot J that it may be capable of retreating therein, as shown in Fig. 4, when the spring F is overpressed by the upper jaw.

The operation of this part of my invention is as follows: The staple having been placed in the eye of the button with the loop of the former parallel to the deflectors n n in the spring-controlled anvil P and the button above the slot v, with the said loop in the arched groove c, and the button-eye in the slotted recess of the upper jaw, the lever a is then pressed forward, which moves the cross-bar 7 of the clamping device g firmly against the staple and end of the jaw, and the grip-stud c' pries beneath the staple-loop, crowding the latter upwardly into the arch-groove c. The staple thus held with their depending prongs directly over the deflectors n n in the anvil P, now standing in its normal position, as seen in Figs. 1, 2, 3, and 8. The fabric being placed over the anvil and supported while being pierced, and the staple-legs spread apart upon the dies n n in a line with each other until the upper jaw, A, comes in contact therewith, overpowering the spring F, driving the anvil P down into the slot J of the lower jaw, forcing the points of the staple-legs against the guide-dies Y Y in the curved face T T of the lower jaw, which they follow in an outward and upward course, as seen in Fig. 4, thereby bending the staple-legs at an acute angle from its loop against the fabric. When the jaws are again opened, the spring returns the anvil to its normal position, as seen in Figs. 1, 2, 3, 8.

In the holding mechanism of the upper jaw it will be seen that I do not depend upon the button for a means of holding a staple, as the latter may be held firmly without in the desired position, and were I to construct the device for holding the staple only, I should make the grip-stud c' to fill the staple-loop, and provide no room for the eye of the button as the groove o does provide in the center of said grip-stud. (See Figs. 5, Sheet 1, and 13 and 14, Sheet 2.)

The guide-bolts i i and sockets a' a' may be dispensed with, as the grip-stud c' performs the same function also as they do, and the former may be only needed where very heavy staples are used.

It is immaterial where the spring F is located and attached to the under jaw, whether it be between the upper and lower jaw or outside of the latter.

Having thus described my invention, what I claim is—

1. In an implement for attaching buttons, a fulcrumed upper jaw having means for holding a button and staple, in combination with a lower jaw provided with a spring-controlled wedge-shaped anvil to spread the forks of the staple, substantially as described.

2. In a button-attaching implement, the combination of two jaws, one of which is provided with means for holding a button and staple, and the other with a spring-controlled deflecting-anvil adapted to spread the forks of the staple and guide them in their outward course, the latter jaw acting independent of said anvil to set the staple firmly upon the fabric, substantially as described.

3. An implement for attaching buttons, having two jaws, A and B, and a movable anvil, P, provided with deflecting dies $n\ n$, and carried by a spring, F, secured to the lower jaw, B, substantially as described.

4. In an implement for attaching buttons, the combination, with the upper jaw, A, having means for holding a button and staple, of the lower jaw, B, having the spring F attached thereto, and carrying the anvil P, formed in one piece with the spring, and provided with deflectors $n\ n$, which are adapted to spread apart the legs of a staple preparatory to being forced up against the fabric in a line with each other, substantially as shown and described.

5. In an implement for attaching buttons, the combination, with the upper jaw provided with means for holding a button and staple, of a movable anvil, P, and spring F, made in one piece, the former provided with deflecting-dies $n\ n$ for spreading and guiding the legs of a staple into the guide-dies Y Y in the curved faces T T of the lower jaw, by which they are clinched in a line with each other, substantially as described.

6. In an implement for attaching buttons, the combination, with the jaw A, provided with means for holding a button and staple, substantially as described, of the lower jaw provided with a slot, J, in its end, forming the sides T T, having curved upper faces, in which are guide-dies Y Y, said jaw provided with the spring F and anvil P, and dies $n\ n$, all constructed and arranged to operate as and for the purpose set forth.

7. In an implement for attaching buttons, the combination, with the jaw A, provided with a front vertical slot, $v$, and arch-groove $c$, of a clamping device provided with the grip-stud $c'$, and means for opening and closing the cross-bar 7 against the end of the jaw and within the staple-loop, substantially as shown and described.

In testimony whereof I have hereunto set my hand, in the presence of two subscribing witnesses, this 8th day of June, 1883.

JOHN H. GOODFELLOW.

Witnesses:
A. E. PRENTISS,
S. H. BEEBE.